United States Patent

Wilson

[11] Patent Number: 5,286,069
[45] Date of Patent: Feb. 15, 1994

[54] STRESS RELIEF GROOVE FOR DRILL PIPE

[75] Inventor: Gerald E. Wilson, Montgomery, Tex.

[73] Assignee: Prideco, Inc., Houston, Tex.

[21] Appl. No.: 985,832

[22] Filed: Dec. 3, 1992

[51] Int. Cl.$^5$ .............................................. F16L 13/04
[52] U.S. Cl. .................................. 285/114; 285/333; 285/286
[58] Field of Search ............... 285/333, 334, 114, 286; 403/343

[56] References Cited

U.S. PATENT DOCUMENTS

| | | | |
|---|---|---|---|
| 1,714,818 | 5/1929 | Reed | 403/343 X |
| 2,239,942 | 4/1941 | Stone et al. | 285/146 |
| 3,691,882 | 9/1972 | Massey | 82/4 C |
| 4,076,436 | 2/1978 | Slator et al. | 403/343 |
| 4,594,020 | 6/1986 | Hughes | 403/343 |
| 4,601,491 | 7/1986 | Bell et al. | 285/334 X |
| 4,760,889 | 8/1988 | Dudman | 175/320 |
| 4,892,337 | 1/1990 | Gunderson et al. | 285/333 |
| 5,040,622 | 8/1991 | Winship et al. | 285/333 X |

OTHER PUBLICATIONS

IADC/SPE paper entitled "What Difference Does MIU Make in the Fatigue Life of Drillpipe?", presented at 1992 IADC/SPE Drilling Conference in New Orleans, Louisiana—Feb. 18-21, 1992.

P. 4259 from Composite Catalog of 1962–1963 describing "Reed Design Stress Relief Groove".

P. 19 of Spec 7: Rotary Drilling Equipment; American Petroleum Institute Table 6.4 shown on p. 20; Table 6.6 shown on p. 21.

Primary Examiner—Dave W. Arola
Attorney, Agent, or Firm—Vaden, Eickenroht, Thompson, Boulware & Feather

[57] ABSTRACT

The fatigue life of the tube section of a joint of drill pipe is increased by locating a stress relief groove in the weld necks of the tool joints adjacent the welds.

11 Claims, 2 Drawing Sheets

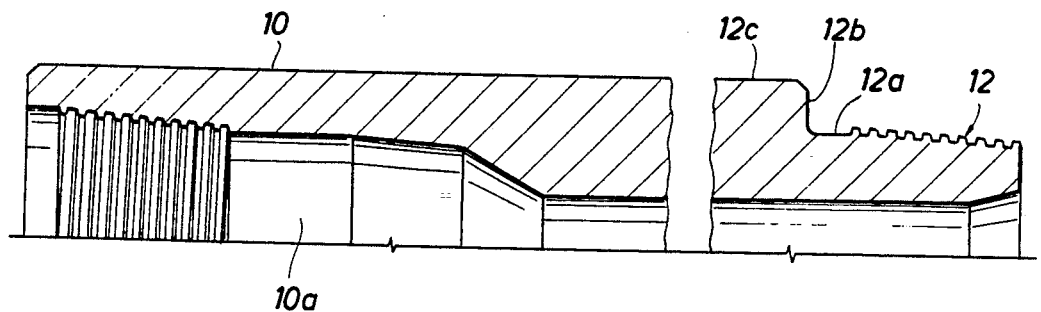
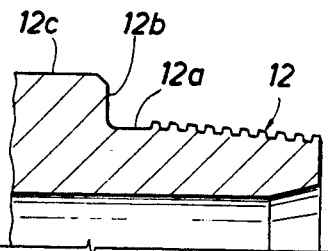
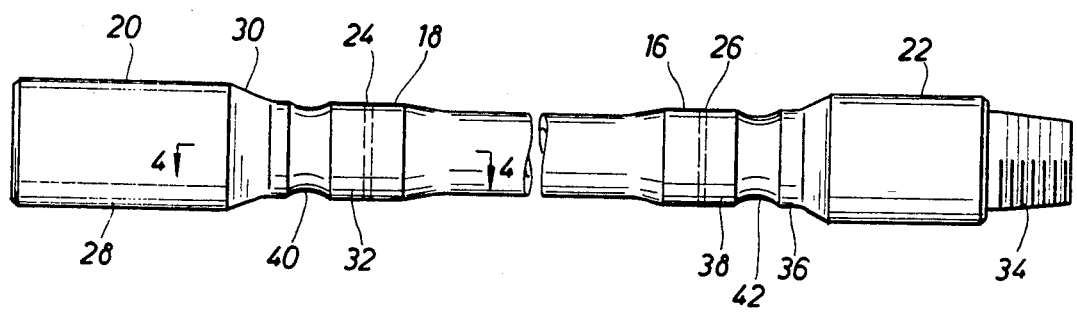
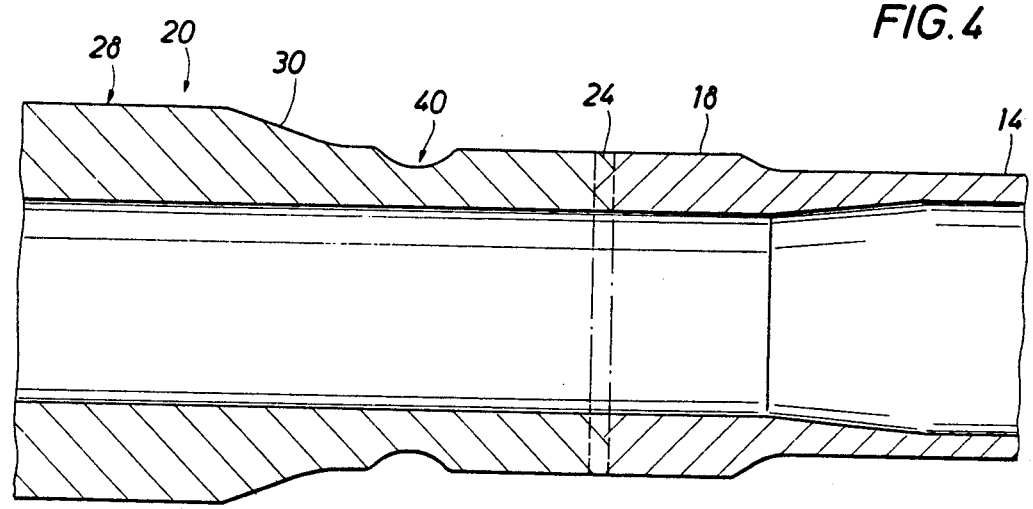

STRESS RELIEF GROOVE FOR DRILL PIPE

This invention relates to stress relief grooves for pipe generally and in particular to a stress relief groove for increasing the fatigue life of the tube portions of drill pipe.

Fatigue failures in drill pipe are caused by stress reversals produced when the pipe is rotated while bent. These stresses are concentrated in the thin wall section of the drill pipe adjacent the thick upset sections at each end of the tube. Drill pipe today is being subjected to higher and higher stresses with the advent of top drives, deeper wells, and high angle holes. This condition is further aggravated by a more hostile environment with the increasing presence of $H_2S$, $CO_2$, and brine water. Many drilling contractors and oil operators along with the IADC and API have made studies of a vast number of failures. Most of them occurred in the tube adjacent to the almost abrupt change in wall thickness between the tube and the upset end portions of the tube. Slip damage on this section of the tube also contributed to the problem. It has also been observed that rapid deterioration of the internal, plastic coating in this area compounds the problem. Both physical testing and finite element analyses of API drill pipe have shown a high stress concentration on the inside of the tube where the short, abrupt upset blends into the drill pipe wall.

In presently pending application Ser. No. 07/801,969, filed Dec. 3, 1991 and entitled "Method of Internally and Externally Upsetting the End of a Metal Tube," an application owned by the assignee of this application now U.S. Pat. No. 5,184,495, a method is described for upsetting the end of a drill pipe tube that produces a substantially longer internal conical transition section between the relatively thick internal cylindrical upset section and the nominal tube wall. The length of this transition section measured along the longitudinal axis of the tube is called "Miu." As a result of lengthening this Miu section, the fatigue life of the tube was greatly increased. For example, three joints A, B, and C having a relatively short Miu as prescribed by API and three joints D, E, and F having Miu tapers of 6 11/16", 7⅛", and 7¾" were rotated while bent to have a radius of curvature of 173 feet, which is the equivalent to a curvature of 33 degrees per 100 feet. Joints A, B, and C failed after 237,618, 235,296, and 205,884 cycles respectively. Joints D, E, and F failed after 382,666, 462,028, and 569,664 cycles respectively. These tests show that lengthening the Miu taper on internal and external upset drill pipe will increase the fatigue life of the tube. This application is incorporated herein by reference.

Similar testing of pipe having a long tapered section connecting the tube to the upset shows a great reduction in stresses in the tube section adjacent the tapered section on the inside of the tube section. As a matter of fact, the stress is lower on the inside of the tube than it is on the outside of the tube. This solves some problems when it comes to inspection. With today's inspection techniques, it is very difficult to find a crack on the inside of plastic coated drill pipe. Finding cracks on the outside of the tube will be much easier. It is also easier to apply a uniform coating of plastic to a long gentle taper than to apply such a coating to a short high angle taper. It is believed this will add considerable life to the drill pipe.

In the past, stress relief grooves have been machined in connections on drill collars and thick wall drilling tools to reduce bending stresses. Today, these features are standard practice, and they seem to work very well. The reason being that drill collars and thick wall drilling tools have a tendency to bend in the connections. Material has been machined away to make the connections, so the connections have less resistance to bending than the thick wall body to which they are connected. Stress relief grooves in the connections reduces their stiffness and allows the connections to flex, thereby reducing the bending stresses. This increases the fatigue life of connections.

In drill pipe, the problem is just the opposite of drill collars. Drill pipe does not bend in the thick wall upset sections and tool joints——it bends in the thin wall tube at or near the runout of the upset. Looking at the tube upset, there is no place for a stress relief groove because of the weld area and the heat effect zone. Maximum upset wall thickness is required in this area to ensure that the weld is stronger than the drill pipe tube. This leaves the tool joint side of the weld to consider. This is an ideal location for a groove, since the metal in the tool joint is very carefully controlled to have a minimum yield of 120,000 psi (828 MPa). Therefore, this section is uniformly much stronger than the drill pipe tube because of the larger cross-sectional area. Because the wall thickness and strength of the material remain constant, the effect of a stress relief groove in this area will be substantially constant.

To provide space for the groove, the weld neck should be extended approximately 2½ inches. This keeps the relief groove out of the radius of the tool joint and away from the weld and the heat effect zone. A relief groove at this point reduces the stiffness in the upset and allows some flexing that reduces the bending stresses in the drill pipe tube and the weld area.

It is an object of this invention to increase the fatigue life of a joint of drill pipe having a tube section with upset ends and tool joints welded to the upset ends of the tube section by locating a stress relief groove in the weld neck of the tool joint.

It is a further object and feature of this invention to increase the fatigue life of a joint of drill pipe by locating a stress relief groove in the weld neck of the tool joint with the ratio of the cross-sectional area below the groove divided by the cross-sectional area of the tube providing a safety factor of about 1.6.

It is a further object and feature of this invention to provide such a stress relief groove to a joint of drill pipe wherein the groove is arcuate and about ¼" deep.

It is a further object of this invention to provide such a joint of drill pipe with an Miu of 4½" or greater and a stress relief groove located in the weld neck of at least one of the tool joints welded to the upset ends of the pipe.

These and other objects, advantages, and features of this invention will be apparent to those skilled in the art from a consideration of the attached drawings and appended claims.

A "joint of drill pipe" a used in this specification shall mean a tube having relatively thin walls, the ends of which having been upset to increase the wall thickness, with tool joints connected at each end. The female tool joint is called a "box" and the male tool joint is called a "pin."

IN THE DRAWINGS

FIGS. 1 and 2 are sectional views through one-half of a tool joint box and one-half of a tool joint pin respectively showing the API approach to stress relief grooves.

FIG. 3 is a view, in elevation, of a joint of drill pipe provided with two stress relief grooves in accordance with this invention.

FIG. 4 is a cross-sectional view on an enlarged scale taken along line 4——4 of FIG. 3.

Figure 5:
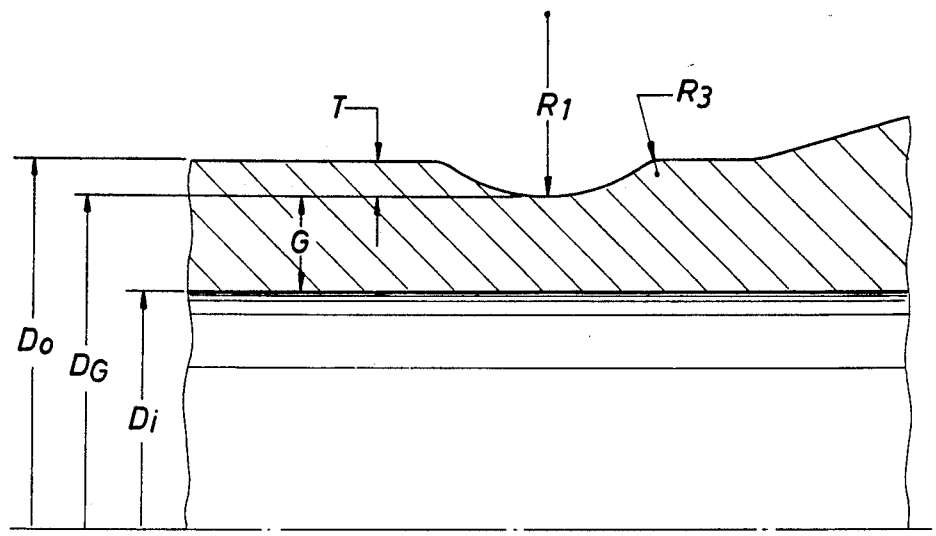
FIG. 5 is a view showing the preferred shape of the stress relief groove of this invention.

FIGS. 1 and 2 show the connection stress relief features for drill collars as specified in API Spec 7: Rotary Drilling Equipment, pages 19, 29, and 21. Another alternate box stress relief feature is shown on page 21 but is not shown in the drawings because the "Boreback Design" shown in FIG. 1 has proven more reliable in actual service conditions and is recommended. The boreback stress relief feature is the extension of bore 10a of the box a substantial distance from the threads before reducing the bore to a diameter equal to or close to that of the drill pipe tube.

Stress relief groove 12a on the pin is located between the threads and shoulder 12b. stress relief groove is sometimes cut in cylindrical surface 12c of the pin.

FIG. 3 is a view in elevation of a drill pipe joint having tube section 14 that is externally and internally upset at each end to provide sections 16 and 18 of increased outside diameter and increased wall thickness. The upset ends of the tube are welded to tool joints 20 and 22 by welds 24 and 26. Tool joint 20 is a box connection comprising cylindrical section 28 that is internally threaded. Tapered section 30 provides a transition zone between larger diameter cylindrical section 28 and weld neck 32. Tapered section 30 normally has an 18° taper to provide a shoulder for engaging elevators to support the pipe as it is being lowered into or pulled from the well bore. Tool joint 22 is a pin connection having external threads 34, tapered section 36, similar to tapered section 30 of the box, and weld neck 38. Stress relief grooves 40 and 42 in accordance with this invention, are located in the weld necks of each tool joint adjacent welds 24 and 26.

Set out below in Table A are the preferred dimensions for the groove in drill pipe ranging from 4"O.D. to 5½" that will provide a safety factor of 1.6. The Table gives dimensions for the groove with both API and internal extra long tapers for both internal upset (I.U.) and internal, external upset (I.E.U.) drill pipe. The location of each dimension in the Table is shown in FIG. 5.

TABLE A

STRESS RELIEF GROOVE DIMENSIONS FOR SAFETY FACTOR OF APPROXIMATELY 1.6

| Drill Pipe Size | $D_i$ Upset I.D. | $D_o$ Upset O.D | $D_G$ Groove Dia. | G Groove Depth | T Groove Wall Thick. | Groove Area |
|---|---|---|---|---|---|---|
| 4" 14.0 lbs/ft. I.U. | 2-11/16 | 4¼ | 3.8772 | 0.1239 | 0.5949 | 6.1341 |
| I.D. = 3.340 | 2-7/16 | 4¼ | 3.7083 | 0.2083 | 0.6354 | 6.1341 |
|  | API 2-5/8 | 4 | 3.8342 | 0.0829 | 0.6046 | 6.1341 |
| 4½" 16.60 lbs. I.E.U. | 3 | 4-11/16 | 4.2482 | 0.2197 | 0.6241 | 7.1056 |
| I.D. = 3.826 | API 2-7/8 | 4-21/32 | 4.1609 | 0.2476 | 0.6430 | 7.1056 |
|  | 2⅞ | 4-11/16 | 4.0755 | 0.2903 | 0.6628 | 7.1056 |
| 4½" 20 lbs. I.E.U. | 2⅞ | 4-11/16 | 4.3415 | 0.173 | 0.6708 | 8.8641 |
| I.D. = 3.640 | API2-13/16 | 4-11/16 | 4.3814 | 0.1531 | 0.7845 | 8.8641 |
|  | 2⅞ | 4-11/16 | 4.1876 | 0.250 | 0.8438 | 8.8641 |
| 5" 19.5 lbs. I.E.U. | 3-1/4 | 5⅜ | 4.625 | 0.250 | 0.6875 | 8.5039 |
| I.D. = 4.276 | API3-9/16 | 5⅜ | 4.8496 | 0.1377 | 0.6436 | 8.5039 |
| 5" 25.6 lbs. I.E.U. | 3-1/4 | 5⅜ | 5.0072 | 0.060 | 0.8786 | 11.396 |
| I.D. = 4.000 |  |  |  |  |  |  |
| 5½ 21.9 lbs. I.E.U. | 3⅜ | 5-11/16 | 4.9207 | 0.3834 | 0.7104 | 9.3962 |
| I.D. = 4.778 | API3-13/16 | 5-9/15 | 5.1477 | 0.2077 | 0.6676 | 9.3962 |
| 5½ 24.7 lbs. I.E.U. | 3⅜ | 5-11/16 | 5.0851 | 0.2389 | 0.7926 | 10.6883 |
| I.D. = 4.670 | API3-13/16 | 5-9/16 | 5.3051 | 0.1290 | 0.7463 | 10.6883 |

To accommodate the grooves set out in Table A above, the weld necks had to be extended approximately 2½". $R_1$ is 1¼" and $R_3$ is ¼".

Figure 6:
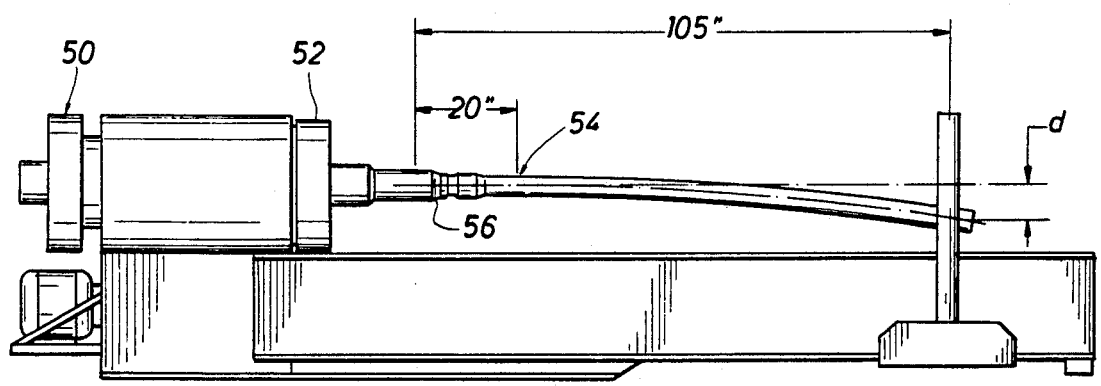
FIG. 6 is a side view in elevation of the fatigue test stand used to test the fatigue life of drill pipe specimens.

A testing program for determining the effect of the stress relief grooves was performed using the apparatus shown in FIG. 6. A lathe was used having back chuck 50 and front chuck 52. 5" 19.5 lbs./ft. I.E.U. S-135 drill pipe with a nominal wall of 0.362" (9.19 mm) was selected for the testing program. All the test samples were cut 120" long. An attempt was made to select long taper upsets with equivalent Miu lengths so this would not be a variable. All the samples were machined so the centerline of the box connections were concentric with the centerline of the tube ends within 0.025 of an inch (0.635 mm). Strain gauge 54 was attached to the outside surface of each sample at the same location—20" (508 mm) from the intersection of the tool joint O.D. and 18° elevator shoulder 56. This located the strain gauges on the tube section of the drill pipe sample. The end of each test sample was deflected a distance D that was equal to 2 3/16" to produce a bending stress of 35,400 psi (244 MPa). This is equal to the stress produced in drill pipe when drilling through a dog leg of approximately 33° per hundred feet. All fatigue tests on the test sample were performed with the same deflection at the end of the pipe to simulate drilling through the same hole curvature for comparison purposes. Strain gauge data show that with the same deflection, the stress in the samples having weld neck relief grooves was approximately 1,040 psi (7.17 MPa) less than the samples discussed above that had only the long taper upset.

Three specimens with the weld neck stress relief grooves were tested to failure in the same type of rotating cantilever beam fatigue machine. The results of these tests are shown in Table 1. Table 2 shows the mechanical properties of the specimens. The fatigue test results shown in Table 1 can be compared to previous fatigue test results for the API upsets and the long taper upsets in Table 3, which is also set out below.

TABLE 1
FATIGUE TEST DATA
Long Taper Upset Combined With Weld Neck Stress Relief Groove

| TEST NUMBER | TAPER LENGTH MIU Inches (mm) | RADIUS R Inches (mm) | CYCLES to FAILURE |
|---|---|---|---|
| 1 | 6⅜ (162) | 48 (1,219) | 1,051,280 |
| 2 | 6 (152) | 48 (1,219) | 838,276 |
| 3 | 5¾ (146) | 38 (965) | 690,356 |

TABLE 2
MECHANICAL PROPERTIES
Long Taper Upset Combined With Weld Neck Stress Relief Groove

| TEST SAMPLE NO. | TENSILE PSI (MPa) | MIN YIELD PSI (MPa) | ELONG. % | IMPACT ft-lbs (Joules) | O.D. inches (mm) | WALL inches (mm) |
|---|---|---|---|---|---|---|
| 1 | 152,949 (1,055) | 142,619 (983) | 20.9 | 50 (68) | 5.003 (127.1) | 0.365 (9.27) |
| 2 | 148,869 (1,026) | 138,505 (955) | 19.6 | 49 (66) | 5.015 (127.4) | 0.349 (8.86) |
| 3 | 149,944 (1,034) | 138,858 (957) | 20.9 | 50 (68) | 5.005 (127.1) | 0.371 (9.42) |

TABLE 3
PREVIOUS FATIGUE TEST DATA

| TEST NUMBER | TYPE UPSET | TAPER LENGTH Miu inches (mm) | RADIUS R inches (mm) | CYCLES to FAILURE |
|---|---|---|---|---|
| 1 | API | 2½ (64) | 6.5 (165) | 235,296 |
| 2 | API | 2½ (64) | 9.0 (229) | 237,618 |
| 3 | API | 2-15/16 (59) | 5.0 (127) | 205,884 |
| 4 | Long Taper | 7⅜ (187) | 48 (1,219) | 462,078 |
| 5 | Long Taper | 7¾ (197) | 46 (1,168) | 569,664 |
| 6 | Long Taper | 6-11/16 (170) | 40 (1,016) | 382,666 |

Cycles to failure were averaged for all three types of specimens and a comparison of these is in Table 4. API—226,300 cycles, long taper 471,500 cycles, and the long taper with weld neck stress relief grooves—860,000 cycles. As can be seen, the long taper upset fatigue life is more than double the fatigue life of the API samples tested and the fatigue life of the weld neck stress relief groove combined with the long taper upset is almost double the fatigue life of the long taper upset and approximately four times the API upset specimens tested.

TABLE 4
FATIGUE TEST AVERAGES

| TYPE OF SPECIMEN | CYCLES to FAILURE |
|---|---|
| API UPSET | 226,300 |
| LONG TAPER UPSET | 471,500 |
| LONG TAPER W/WELD NECK STRESS RELIEF GROOVE | 860,000 |

From the foregoing it will be seen that this invention is one well adapted to attain all of the ends and objects herein above set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In a joint of drill pipe having a tube section with upset ends to increase the wall thickness of the tube at its ends and tool joints connected to each end of the tube, each tool joint having a weld neck with a wall thickness equal to that of the upset end of the tube that is welded to the upset end of the tube, the improvement comprising an external, arcuate stress relief groove in the weld neck adjacent the weld to increase the fatigue life of the tube section of the drill pipe when the drill pipe is subjected to varying stresses produced by rotating the drill pipe while bent 2. The joint of claim 1 in which the cross-sectional area of the tool joint weld neck under the groove is greater than the cross-sectional area of the tube section of the pipe.

3. The drill pipe joint of claim 1 in which the cross-sectional area under the groove is about 1.6 times the cross-sectional area of the tube.

4. The drill pipe joint of claim 1, 2, or 3, in which the arcuate groove has a radius of curvature of between ½ and 3½ inches.

5. In a joint of drill pipe including a tube having internal-external upset ends with a box having a weld neck welded to one of the upset ends and a tool joint pin having a weld neck welded to the other upset end, said upset ends having internal tapers (Miu), the improvement comprising, arcuate external stress relief grooves in the weld necks of the tool joints adjacent the welds between the tool joints and the upset end of the tube, the depth of the grooves being such that the cross-sectional areas between the bottoms of the grooves and the inside wall of the tool joints weld necks are greater than the cross-sectional area of the non-upset portion of the tube.

6. The joint of drill pipe of claim 5 in which the depth of the grooves is about 10% to 35% of the wall thickness of the tool joint at the location of the groove.

7. The joint of drill pipe of claim 5 in which the minimum cross-sectional areas between the bottoms of the grooves and the inside wall of the tool joints weld necks are about 1.6 times the area of the non-upset portion of the tube.

8. The joint of claim 5, 6, or 7, in which the depth of the groove gives a safety factor of at least 1.5 times the cross-sectional area of the non-upset portion of the tube.

9. The joint of claim 5, 6, or 7, in which the groove a radius of between ½ and 3½ inches.

10. The joint of claim 5 in which the internal tapers of the upsets are at least 3½ inches measured along the longitudinal axis of the upset.

11. The joint of drill pipe of claim 5 in which the depth of the groove is about 27% of the wall thickness of the tool joint at the location of the groove.

* * * * *